UNITED STATES PATENT OFFICE 2,002,613

REACTION PRODUCT OF AN ORGANIC ACID AMIDE AND AN ALKYLENE OXIDE

Ludwig Orthner, Leverkusen I. G. Werk, and Helmut Keppler, Leverkusen-Schlebusch, Germany, assignors to General Aniline Works, Inc., New York, N. Y., a corporation of Delaware No Drawing. Application February 23, 1933, Serial No. 658,267. In Germany February 29, 1932

12 Claims. (Cl. 260—124)

The present invention relates to new reaction products from 1 molecular quantity of an organic compound containing a radical with at least 8 carbon atoms directly linked to each other and one or several groups of the following formula:

or

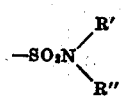

wherein R' means hydrogen or an alkyl, aralkyl, aryl, cycloalkyl, monohydroxyalkyl, polyhydroxyalkyl radicle, and R" stands for hydrogen or a monohydroxyalkyl-, polyhydroxyalkyl radicle and at most 3 molecular quantities of alkylene oxides for each reactive hydrogen atom of the aforesaid groups, whereby the obtained products may wholly or partially be transformed into compounds having an acid character, with the aid of polyvalent inorganic acids, their derivatives or conversion products.

The new reaction products are obtained as mixtures the composition of which changes according to the manufacturing manner. In consequence thereof no formulæ can be given for such reaction products.

The new compounds are obtained, for instance, by treating a higher molecular carboxylic acid amide of the formula:

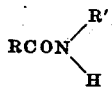

or a higher molecular sulfonic acid amide of the formula:

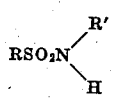

wherein R means a radical with at least 8 carbon atoms directly linked to each other, R' stands for hydrogen, or an alkyl-, aralkyl-, aryl radicle, in the presence of alkaline substances such as, for example, caustic alkalies or alkali alcoholates in the substantial absence of water; with an alkylene oxide, for instance, at a temperature of about 110 to 160° C., either in a pressure vessel or by introducing the alkylene oxide into the substance molten or dissolved in an indifferent solvent.

As to capability of reacting upon alkylene oxides or with a view to the physical properties and the efficacy of the conversion products, acid amides, which are substituted on the nitrogen atom by alkyl radicals containing hydroxyl groups, are especially suitable. Such amides have, for instance, the formula:

$$R-CO-NH-C_2H_4-OH$$

or $$R-CO-NH-CHOH-CH_2OH$$

or

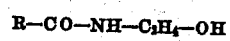

or

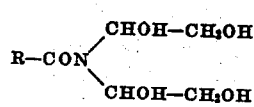

Of course, any advantageously obtainable mixtures of these hydroxyalkyl amides may be applied. The aforesaid hydroxyalkyl amides react with alkylene oxides even in the presence of water; basic substances promote the reaction. The behavior of these hydroxyalkyl amides towards the alkylene oxides is different from that of higher molecular alcohols with the same number of hydrocarbon atoms.

The manufacture of the carboxylic acid amides serving as starting materials takes place by condensation of carboxylic acids or sulfonic acids, respectively, or their derivatives such as, for instance, chlorides or esters, with such amines as possess at least one hydrogen atom linked to the nitrogen. The fatty acid amides obtainable from the naturally occurring glycerides by the conversion with primary or secondary hydroxyalkyl amines are preferably suitable for the conversion with alkylene oxides. These aminolysis products can be used in a purified state or as raw products. In the latter case, of course, a part of the introduced alkylene oxide is lost for the proper reaction, for instance, by binding to the glycerine split off from the glyceride. In this case some larger quantity of alkylene oxide is necessary in order to reach a certain solubility in water or capacity of being dispersed than in the case of the purified aminolysis products.

Besides the condensation of the alkylene oxides with the amide- or OH-groups also a polymerization of the alkylene oxide or its conversion into aldehydes, respectively, always takes place; the higher the condensation temperature is, the more frequent are the by-reactions which may give rise to the formation of darker colored reaction products. In the beginning of the conversion the alkylene oxides are comparatively slowly bound; the absorptive capacity for alkylene oxides is then raised, while the conversion is continued. For the aforesaid reasons it is suitable to choose a higher conversion temperature in the beginning and to lower it in the course of the reaction.

The products obtained in accordance with the process of this application are not uniform substances. Of course, for instance, in the conversion of an amide $RCONH_2$ with ethylene oxide at first a part of the molecules $RCONH_2$ there will be transformed into molecules of the constitution $RCONHC_2H_4OH$, but the ethylene oxide can then be added to the hydroxyl group as well as to the acid amide group. Even as to the number of the added alkylene oxide molecules very different substances are obtained. There are always obtained mixtures of substances variable in the degree of condensation. These mixtures contain starting materials and substitution products of different kinds.

Just in their non-uniformity lies the advantage of the new products; thus, in the same product, substances of a different, quite gradually changing solubilities in water or lipoids are present, whereby the mixtures can be dissolved or easily dispersed for instance, in water, or can facilitate the solution or emulsion of the most different insoluble substances in water better than uniform substances.

The new alkylene oxide conversion products are wax-like, pasty, salvy or oily, partially colored substances; the liquid products are colored with darker shades than the half-solid or solid ones. A clarification can be obtained by the treatment with oxidizing agents such as peroxides, hypochlorites and/or by a treatment with absorbing agents such as decolorizing carbon or fuller's earth. If the solubility or the dispersive capacity of these products are not sufficient for certain purposes, the solubility or dispersive capacity in water can be raised by the complete or partial conversion of the new substances with polybasic, inorganic acids such as, for instance, sulfuric-, phosphoric-, carbonic-, acid etc. or their derivatives or conversion products such as anhydrides, chlorides, esters, amides; instead of the compounds prepared with acid reaction their salts with inorganic or organic bases can also be used.

All products prepared according to the process of the present application can more easily be dissolved or dispersed in water than the starting materials. As any degree of solubility, of swelling or dispersing capacity in water or organic solvents can be obtained by a suitable election of the starting materials and of the quantity of the alkylene oxide or by a corresponding conversion with polybasic inorganic acids, it is possible to provide a suitable solubility stage for every purpose. Many substances of this group of compounds may be applied, where difficulties occur through hardness of natural water on using common soaps, in that these substances can replace these soaps, or they transform the insoluble soaps produced with hard water into a harmless form by dissolving or dispersing.

The substances of this group of new compounds, being more soluble in water, are suitable as addition products to the liquors, for the treatment of textiles, for instance, in washing, dyeing, after-treating, mercerizing, carbonizing and fulling, in order to raise the cleaning-, wetting-, dispersing-, emulsifying-, equalizing- and dyeing capacity, furthermore, to improve the fastness of dyeings to rubbing and to stabilize diazo solutions. They can also be used as solvents and as agents facilitating the preparation of a paste, moreover, as emulsifying agents, for instance, for oils, fats and hydrocarbons. The substances of this group, which are sufficiently soluble in lipoids, may be employed in the preparation of meltings, sizes, finishings and as softening agents for textiles, furthermore, for the production of salves, cosmetical and pharmaceutical preparations, greasing agents, stuffing agents, consistent fats, cutting or bore oils, polishing masses, agents for protecting the surface of metals and as addition products to lacquers, varnishes and caoutchouc.

The said substances can be used as such or in mixture with each other or with unchanged starting material or together with cleaning-, wetting-, dispersing-, agents and solvents which are improved as to their effect by the new products, or which eventually serve to bring the conversion products into a form suitable for the use. As such addition products there come into question, for instance, fatty acid soaps, Turkey red oils, mineral oils and fatty alcoholsulfonates, condensation products of higher fatty-, naphthene- and resin acids with hydroxy- and aminoalkyl-sulfonic acids, alkylated naphthalene-sulfonic acids, albuminous substances, their decomposition products or derivatives or conversion products, respectively, sulfite liquor, water-soluble gums, mucilage, alcohols, ketones, hydrocarbons or halogenated hydrocarbons etc. or mixtures of these substances. Even lipolytical-, proteolytical-, and splitting off carbon hydrate enzymes come into question as addition products.

As starting materials amides of carbonic acids or organic sulfonic acids can be used, if in their nitrogen atom replaceable hydrogen atoms are still present, and/or if the substituents, attached to the nitrogen, contain hydroxyl groups.

As examples there may be mentioned the amides prepared with ammonia of the acid mixtures being the foundation of the following glycerides: palm oil, coconut oil, olive oil, poppy-seed oil, rape oil, cotton seed oil, linseed oil, soya bean oil, train oil, wood oil, castor oil; the unsaturated glycerides may also be wholly or partially hydrogenized. Furthermore, as carbonic acids there may be mentioned fatty acids obtainable from paraffins by oxidation, undecylenic acid, lauric acid, stearic acid, oleic acid, dihydroxy-stearic acid, montan acids, resin acids, naphthenic acids, phthalic acid, phthalamine acid, 1.8-naphthalene-carbonic acid, cyclohexyl-propionic acid. Other amides, for instance, naphthalene sulfamide and the derivatives thereof, alkylated in the nucleus, sulfopalmitic acid amide, cetylsulfamide, dodecylsulfoester amide, hydroxy-naphthalene-sulfamide come into consideration.

Instead of ammonia there may be used for the manufacture of suitable amides: primary amines, for instance, methylamine, butylamine, benzylamine, undecylamine, hydroxyethylamine, aminopropiandol, cyclohexylamine, heptadecylamine, heptadecylene amine, aniline and its homologues and substitution products, aminophenols, aminonaphthols, phenylene-diamine; furthermore, secondary amines such as butylhydroxyethylamine, hydroxyethylaniline, diethanolamine, di-(propiandol)amine, 4-dihydroxyphenylethylamine.

Instead of the said starting materials there can be advantageously applied chlorine derivatives such as dichlorostearylhydroxyethylamide besides other substitution products.

The following examples serve to illustrate our invention but without limiting it thereto. The parts are by weight.

Example 1.—100 parts of a raw or purified conversion product from coconut- or palm oil with aminoethyl alcohol, obtainable according to British Letters Patent 384,665 (Example 3) are converted, with the addition of some sodium lye at a raised temperature, say, for instance, at about 140–70° C., with 30 to 70 parts of ethylene oxide. The reaction can also be carried out in the presence of large quantities of water. Sirupy or half-solid masses easily soluble in water are obtained. The aqueous solutions foam strongly, on acidifying with mineral acids no precipitation occurs.

Wool is washed in a bath of hard water of about 20° C. containing 0.5 g. per liter of the products, thus prepared in a dissolved state. An excellent purifying effect is obtained which is improved by the addition of alkali, for instance, sodium, alkali-phosphates or -borates.

Instead of the ethanolamine there can be used for the manufacture of starting materials from the coconut oil also the 1-amino-2,3-propiandol or the secondary amines corresponding to these two primary amines, respectively, or technical mixtures which contain these primary and secondary amines as chief products. With suitable quantities of ethylene oxide, defined by experiments, depending upon the kind of amine and upon the conversion temperature, products with excellent emulsifying- or washing properties or wetting-, equalizing- and dispersing effect for insoluble dyestuffs or calcium soaps can be obtained.

Instead of coconut- or palm oil there may also be employed for the aforesaid conversions soya bean oil, cottonseed oil, train oil or other unsaturated glycerides or the products prepared therefrom by a partial hardening. The products obtained by higher quantities of ethylene oxide are distinguished by an especially high dispersing power for insoluble substances such as dyestuffs and calcium soaps and by an excellent equalizing- and wetting capacity.

For the conversion with ethylene oxide also the amides are suitable which can be obtained from free carbonic acids such as coconut oil fatty acids, soya bean oil fatty acids and ammonia or primary or secondary amino-alcohols.

Example 2.—Water-soluble, well foaming, purifying agents of a high effect being fast to acid and calcium, are obtained by mixing the products having a good washing effect, described in Example 1, with agents dissolving fat, such as benzines, terpenes, halogenated hydrocarbons, hydrogenated aromatic hydrocarbons, aliphatic, aromatic, aromatic-aliphatic or hydroaromatic alcohols or ketones.

20 parts of the product as described in Example 1 are mixed with 2 parts of benzyl alcohol and 10 parts of cresylglycol in the presence of 68 parts of water. The liquid thus obtained is easily soluble in water; the aqueous solutions foam strongly and possess an excellent purifying-, wetting-, fat-dissolving- or emulsifying capacity.

Instead of the benzyl alcohol there can preferably be employed also hydrogenized xylenol and xylenylglycolether instead of cresylglycol and -enzylalcohol.

Example 3.—A raw or purified conversion product prepared from train oil and ethanolamine in accordance with British Letters Patent 384,665 is converted with ½ to 2 molecular quantities of ethylene oxide in the pressure vessel at about 60 to 100° C., while adding some aqueous alkali.

100 parts of the product thus obtained are added to 150–200 parts of a sulfuric acid of a temperature of about 60 to about 66° Bé., while stirring. A viscose mass is obtained which is pressed, after standing for some time, into an excess of sodium lye. The sodium salt of the sulfonic acid thus obtainable possesses the capacity of dispersing the insoluble alkaline-earth soaps prepared with common soaps, in a fine form so that no formation of flocks occurs even on heating.

A similar product results from the conversion of the aforesaid product from ethylene oxide with an excess of phosphortrichloride.

Conversion products of 1–4 molecular quantities of ethylene oxide with the reaction products from oleic-, soya beans oil-, linseed oil-, cottonseed oil-, coconut oil- or palm oil fatty acids, the chlorides or glycerides on mono-ethanolamine or 1-amino-2,3-propandiol may be applied with the same result instead of the conversion product of ethanolamine mentioned in this example. Wetting and dispersing agents for insoluble dyestuffs, their preliminary products and calcium soaps, being fast to calcium, acids and alkali, are obtained. The equalizing- and dyeing effect of these substances can be increased by the addition of albuminous decomposition products as obtained by the alkaline treatment of skin- and leather waste.

By converting the mono-ethanolamine of the coconut- or palm oil fatty acids with ½ to 3 molecular quantities of ethylene oxide, by a subsequent sulfitation with concentrated sulfuric acid or mono-hydrate—eventually in the presence of carbon tetrachloride— a product is obtained which shows an excellent washing-, foaming- and wetting capacity in a neutral or alkaline solution.

These products preliminarily treated with ethylene oxide possess in the subsequent sulfonation essential advantages over those not treated therewith. The sulfonation may be carried out at comparatively low temperatures—if desired— with very soft sulfonating agents such as 80 to 90% sulfuric acid, whereby clearer products are prepared; these sulfonation products are faster to hydrolyzing agents, and in many respects they have a better effect than those sulfonation products prepared under the same conditions, from products not treated with ethylene oxide.

The aforesaid sulfonations may be carried out even in the presence of solvents or condensation agents such as benzines, edeleanu extracts, halogenated or aromatic hydrocarbons, lower fatty acids, the chlorides or anhydrides thereof, whereby—according to the sulfonating conditions—the unsaturated or aromatic hydrocarbon radicles react at the same time.

By the treatment of the solution of the starting materials in the sulfuric acid with chlorine—eventually in the presence of indifferent diluents such as carbon tetrachloride, chlorinated water-soluble products which are in some respects more effective are obtained which may be applied as weighting agent for fibers.

*Example 4.*—1 molecular quantity of the fatty acid amide prepared from tallow or hardened train oil or coconut fatty oil and ethanolamine according to British Letters Patent 384,665 is converted with ½ to 2 molecular quantities of ethylene oxide or propylene oxide after the addition of about 0.5% of caustic soda lye in the pressure vessel at about 60 to 120° C.

40 parts of the product, thus prepared, to which amide or hydroxy-alkylamides of saturated higher fatty acids may be admixed, are finely dispersed in 150 parts of water with the aid of 6 parts of the sodium salt of the oleylmethyltaurine; there is obtained a white paste which dissolves in warm water or gives a fine, stable dispersion therewith.

An addition of this paste to dye- or after-treatment baths of artificial silk gives the fibers a soft, fluent touch. Hard water does not injure the efficacy of the treatment baths.

*Example 5.*—Ethylene oxide is introduced into 40 parts of a product, obtained from partially hydrogenized train oil (according to Example 3 of British Letters Patent 384,665) by converting with ammonia, until the increase in weight amounts to 24 parts, while adding some caustic soda or alkali alcoholate and eventually some organic base beginning at temperatures of at the most 180° C. which are lowered during the reaction to 80° C., but not less. A weakly colored fat-like mass results which may be used as a softening agent or—eventually together with solvents or other dispersing agents—for the manufacture of emulsions of mineral oils.

Instead of the ethylene oxide there can also be used propylene- or butylene oxide.

The conversion of the amide with ethylene oxide can also be carried out in the presence of indifferent solvents such as benzines or aromatic hydrocarbons.

Substances which are prepared by converting carbonic acids of glycerides with less than the calculated quantity of primary or secondary amines, for instance, with 50% of the theoretically necessary quantity, are also suitable as emulsifying agents after the addition of alkylene oxides.

*Example 6.*—25 parts of dibutylnaphthalenesulfamide are converted with the same amount by weight of ethylene oxide in the presence of a little alkali at a temperature of about 140 to about 180° C. The product thus obtained is a hydrotropical substance.

We claim:

1. The process which comprises reacting one molecular proportion of a compound of the general formula:

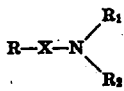

in which R denotes a radicle of an organic compound containing at least 8 carbon atoms directly connected to each other, X stands for —CO— or —SO$_2$—, R$_1$ denotes hydrogen or an alkyl, hydroxyalkyl, aralkyl, aryl or cycloalkyl radicle, and R$_2$ denotes hydrogen or a hydroxyalkyl radicle with at most 3 molecular proportions of an alkylene oxide per each reactive hydrogen atom of R$_1$ and R$_2$.

2. The process which comprises reacting one molecular proportion of a compound of the general formula:

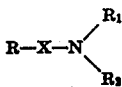

in which R denotes a radicle of an organic compound containing at least 8 carbon atoms directly connected to each other, X stands for —CO— or —SO$_2$—, R$_1$ denotes hydrogen or an alkyl, hydroxyalkyl, aralkyl, aryl or a cycloalkyl radicle, and R$_2$ denotes hydrogen or a hydroxyalkyl radicle with at the most three molecular proportions of an alkylene oxide per each reactive hydrogen atom of R$_1$ and R$_2$ and treating the resulting products with a polybasic inorganic acid or a derivative thereof under such conditions of reaction that the reaction product obtains an acid character.

3. The process which comprises reacting one molecular proportion of a compound of the general formula:

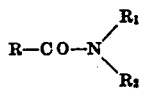

in which R denotes a radicle of an organic compound containing at least 8 carbon atoms directly connected to each other, R$_1$ denotes hydrogen or an alkyl, hydroxyalkyl, aralkyl, aryl or cycloalkyl radicle and R$_2$ denotes hydrogen or a hydroxyalkyl radicle with at the most three molecular proportions of an alkylene oxide per each reactive hydrogen atom of R$_1$ and R$_2$.

4. The process which comprises reacting one molecular proportion of the mono-ethanol amide of the coconut oil fatty acid with 2 to 4 molecular proportions of ethylene oxide.

5. The process which comprises reacting one molecular proportion of the ethanol amide of the coconut oil fatty acid with 1 to 2 molecular proportions of ethylene oxide and treating the resulting product with sulfuric acid under such conditions of reaction that the reaction product is sulfonated.

6. The composition of matter obtainable by reacting one molecular proportion of a compound of the general formula:

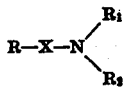

in which R denotes a radicle of an organic compound containing at least 8 carbon atoms directly connected to each other, X stands for —CO— or —SO$_2$—, R$_1$ denotes hydrogen or an alkyl, hydroxyalkyl, aralkyl, aryl or a cycloalkyl radicle, and R$_2$ denotes hydrogen or a hydroxyalkyl radicle, with at the most 3 molecular proportions of an alkylene oxide per each reactive hydrogen atom of R$_1$ and R$_2$; said products being wax-like, pasty, salvy or oily substances and having good properties as auxiliary substances for the textile-, leather-, paper-, caoutchouc-, lacquer industries.

7. The composition of matter obtainable by reacting one molecular proportion of a compound of the general formula:

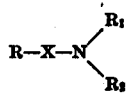

in which R denotes a radicle of an organic compound containing at least 8 carbon atoms directly connected to each other, X stands for —CO— or SO$_2$—, R$_1$ denotes hydrogen or an alkyl, hydroxyalkyl, aralkyl, aryl or a cycloalkyl radicle, and R$_2$ denotes hydrogen or a hydroxyalkyl radicle with at the most 3 molecular proportions of an alkylene oxide per each reactive hydrogen atom of R$_1$ and R$_2$ and treating the resulting products with a polybasic inorganic acid or a derivative thereof under such conditions of reaction that the reaction product obtains an acid character; said products being wax-like or pasty substances having good properties as auxiliary substances for the textile-, leather-, paper-, caoutchouc-, lacquer industries.

8. The composition of matter obtainable by reacting one molecular proportion of a compound of the general formula:

in which R denotes a radicle of an organic compound containing at least 8 carbon atoms directly connected to each other, R$_1$ denotes hydrogen or an alkyl, hydroxyalkyl, aralkyl, aryl or a cycloalkyl radicle, and R$_2$ denotes hydrogen or a hydroxyalkyl radicle with at the most 3 molecular proportions of one alkylene oxide per each reactive hydrogen atom of R$_1$ and R$_2$; said products being wax-like, pasty, salvy or oily substances and having good properties as auxiliary substances for the textile-, leather-, paper-, caoutchouc-, lacquer industries.

9. The composition of matter which comprises the reaction product of one molecular proportion of the mono-ethanol amide of the coconut oil fatty acid and 2 to 4 molecular proportions of ethylene oxides; said substances being weakly colored pasty products soluble in water and having good properties as washing, foaming, wetting, cleansing, emulsifying and softening agents.

10. The composition of matter which comprises the sulfonated reaction products of one molecular proportion of the ethanol amide of the coconut oil fatty acid and 1 to 2 molecular proportions of ethylene oxide; said substances being in the shape of their alkaline salts wax-like, weakly colored substances easily soluble in water and having good properties as cleansing, washing, foaming, wetting, equalizing and dispersing agents.

11. The composition of matter comprising the reaction products of one molecular quantity of a compound of the general formula:—

in which R denotes the radical of a higher saturated or unsaturated natural fatty acid, R$_1$ means H or the hydroxyethyl- or 2,3-dihydroxypropyl group and R$_2$ stands for the hydroxyethyl- or 2,3-dihydroxypropyl group, with at the most 3 molecular quantities of ethyleneoxide per each reactive hydrogen atom; said products being weakly colored pasty products soluble in water and having good properties as washing, foaming, wetting, cleansing, emulsifying and softening agents.

12. The composition of matter which comprises the sulfonated reaction products of one molecular quantity of a compound of the general formula:—

in which R denotes the radical of a higher saturated or unsaturated fatty acid, R$_1$ means H or the hydroxyethyl- or 2,3-dihydroxypropyl group and R$_2$ stands for the hydroxyethyl- or 2,3-dihydroxypropyl group, with at the most 3 molecular quantities of ethylene oxide per each reactive hydrogen atom; said products being in the shape of their alkaline salts wax-like, weakly colored substances easily soluble in water and having good properties as cleansing, washing, foaming, wetting, equalizing and dispersing agents.

LUDWIG ORTHNER.
HELMUT KEPPLER.